(12) United States Patent
Naggies et al.

(10) Patent No.: US 12,730,003 B2
(45) Date of Patent: Sep. 8, 2026

(54) PHOTOMETRIC PROCESS MEASUREMENT ARRANGEMENT AND A PHOTOMETRIC MEASUREMENT METHOD

(71) Applicant: HACH LANGE GMBH, Berlin (DE)

(72) Inventors: Andre Naggies, Berlin (DE); Axel Leyer, Berlin (DE); Robert Dalljo, Berlin (DE)

(73) Assignee: HACH LANGE GMBH, Berlin (DE)

( * ) Notice: Subject to any disclaimer, the term of this patent is extended or adjusted under 35 U.S.C. 154(b) by 4 days.

(21) Appl. No.: 18/864,691

(22) PCT Filed: May 10, 2023

(86) PCT No.: PCT/EP2023/062374

§ 371 (c)(1),
(2) Date: Nov. 11, 2024

(87) PCT Pub. No.: WO2023/217836

PCT Pub. Date: Nov. 16, 2023

(65) Prior Publication Data

US 2025/0314528 A1 Oct. 9, 2025

(30) Foreign Application Priority Data

May 12, 2022 (EP) .................................... 22173056

(51) Int. Cl.
*G01J 3/02* (2006.01)
*G01J 3/10* (2006.01)
*G01J 3/28* (2006.01)

(52) U.S. Cl.
CPC ................. *G01J 3/027* (2013.01); *G01J 3/10* (2013.01); *G01J 3/2803* (2013.01)

(58) Field of Classification Search
CPC .. G01J 3/027; G01J 3/10; G01J 3/2803; G01J 2003/2806
See application file for complete search history.

(56) References Cited

U.S. PATENT DOCUMENTS 5,053,757 A * 10/1991 Meadows ............. G06F 3/0442 345/173
5,677,532 A * 10/1997 Duncan ................. G01J 5/0014 250/330

(Continued)

FOREIGN PATENT DOCUMENTS

EP 2320213 A2 5/2011
FR 3088720 A1 5/2020

OTHER PUBLICATIONS

Kurchuk et al., "Signal-Dependent Variable-Resolution Clockless A/D Conversion With Application to Continuous-Time Digital Signal Processing," in IEEE Transactions on Circuits and Systems I: Regular Papers, vol. 57, No. 5, pp. 982-991, May 2010, doi: 10.1109/TCSI.2010.2043987 (Year: 2010).*

(Continued)

*Primary Examiner* — Kara E. Geisel
*Assistant Examiner* — Jonathon Cook
(74) *Attorney, Agent, or Firm* — Ference & Associates LLC

(57) ABSTRACT

A photometric process measurement arrangement and a photometric measurement method. The invention refers to a photometric process measurement arrangement (10) comprising a photometric immersion probe (20) comprising a photometer flashlight source (61) for providing photometric light impulses, a photometric detector arrangement (70) comprising a separate wavelength-selective detection element (71, 72, 73), and a photometer control (80) controlling the photometer flashlight source (61) and the detector arrangement (70), The photometer control (80) comprises: An impulse signal integrator (819, 829, 839) for integrating the electric impulses having the impulse intensity (Ui) generated by the detection element (71, 72, 73) of one impulse integration cycle (204; 221; 264), a measurement cycle control (90) for adapting the total number of 20

(Continued)

Figure 1:
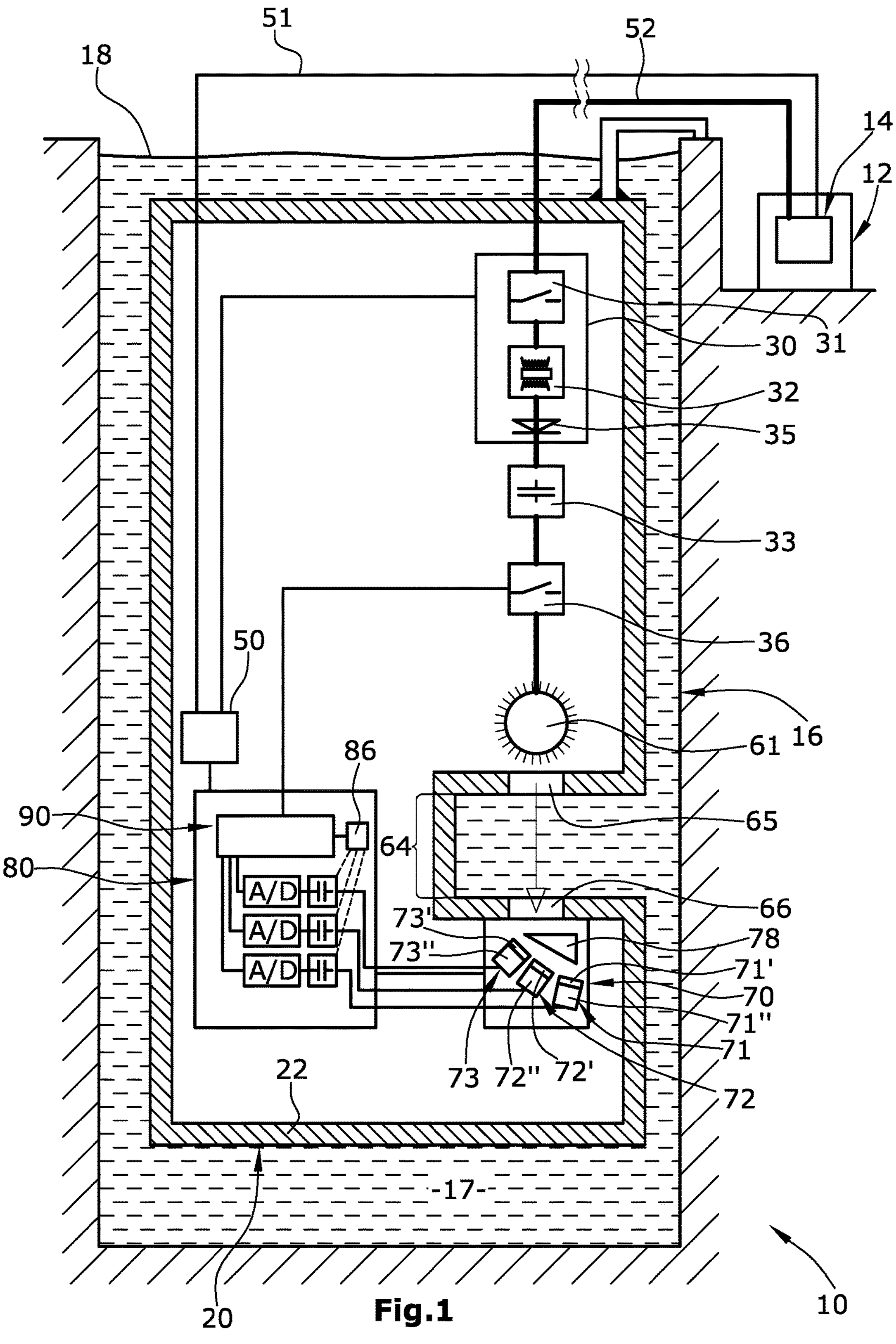

integrated cycle impulses of an impulse integration cycle (204; 221; 264) to the impulse intensity (Ui) of the single electric impulses, an A/D-converter (81, 82, 83) for converting the voltage of the impulse signal integrator (819, 829, 839) in an optional compulsory A/D conversion interval (100) after the impulse integration cycle (204; 221; 264), and an A/D-conversion management module (150) for balancing the total number of A/D conversion intervals (100-111) within a time frame (F), whereas the number of supplementary A/D conversion intervals (101-111) after the compulsory A/D conversion interval (100) depends on the length of the corresponding impulse integration cycle (204; 221; 264).

6 Claims, 4 Drawing Sheets

(56) References Cited

U.S. PATENT DOCUMENTS

| | | | | |
|---|---|---|---|---|
| 6,630,669 | B1 * | 10/2003 | Chin | G01J 5/10<br>341/162 |
| 2011/0108720 | A1 * | 5/2011 | Ford | G01N 21/274<br>250/262 |

OTHER PUBLICATIONS

European Patent Office, International Search Report and Written Opinion, Aug. 28, 2023, 9 pages.

* cited by examiner 36
61
64
70
78
71
71'
71''
72
72'
72''
73
73'
73''
80
81
81'
82
82'
83
83'
A/D
A/D
A/D
H
L
H
L
86
91
92
93
96
98
90
99
99'
120
150

U/V
t/s
Us
Ut
0
F
Ui
ti
tc
100
204
MC 101
102
103
221
303

PHOTOMETRIC PROCESS MEASUREMENT ARRANGEMENT AND A PHOTOMETRIC MEASUREMENT METHOD

The present application is a National Phase Entry of PCT International Application No. PCT/EP2023/062374, which was filed on May 10, 2023, the contents of which are hereby incorporated by reference, which claims priority to EP Application Serial No. 22173056.7 filed May 12, 2022, the contents of which are hereby incorporated by reference.

The invention refers to a photometric process measurement arrangement with a photometric immersion probe and to a photometric measurement method provided by the photometric process measurement arrangement.

A photometric process measurement arrangement comprises a photometric immersion probe being immersed into the water of a water basin. The water basin can be a part of a water treatment plant for continuously controlling drinking water or for controlling a process step of a wastewater treatment process. A typical photometric immersion probe is disclosed in DE 10 2005 007 142 A1. A state-of-the art immersion probe comprises a photometer flashlight source for providing photometric light impulses with a sufficiently continuous or a quasi-continuous spectrum and comprises a photometric detector arrangement with at least two separate wavelength-selective detection elements.

In a state-of-the-art photometric control, the wavelength-selective detection elements are provided with impulse signal integrators for integrating the electric impulses generated by the detection elements. The impulse signal integrators are capacitors having a saturation voltage which must not be exceeded during the integration process within a measurement cycle so that the number of integratable flashlight source flashes within one impulse integration cycle is limited.

The general application environment of the photometric process measurement arrangement can be very clear drinking water as well as highly turbid wastewater, so that the maximum acceptable number of flashlight source flashes within one impulse integration cycle can range between a very few flashes for very clear drinking water causing a relatively high impulse intensity of every single electric impulse to more than a hundred flashes for very turbid waste water causing an extremely low impulse intensity of every single electric impulse. However, the capacity of the impulse signal integrators should be utilized as much as possible to optimize the signal to noise ratio for the A/D conversion of the voltages of the impulse signal integrators. Therefore, the number of integrated electric impulses of one impulse integration cycle is adapted to the turbidity of the sample water.

One photometric light impulse typically has a period time of 5 to 30 ms. One full impulse integration cycle of a measurement cycle can have only four impulses for very clear sample water or can have, for example, more than one hundred impulses for very turbid sample water. Right after a full impulse integration cycle, a compulsory A/D conversion of the voltages of the impulse signal integrators is provided. Assuming an impulse period time of 20 ms and a conversion time of typically 100 ms for the A/D conversion, the full time period of a measurement cycle would be in the range of 200 ms for very clear sample water and would be in the range of more than 1000 ms for a relatively turbid water sample.

The accuracy of the A/D conversion depends on many factors, and is not at all perfect for very small voltage values which as given in this application. The accuracy can only be improved by averaging a couple of A/D conversion results. The more compulsory A/D conversion results are averaged, the longer is the time period between two resulting parameter concentration results of the sample water.

If the time period between two consecutive parameter concentration results of the sample water is kept constant which is important for a closed loop control circuit, the accuracy of the parameter concentration results is good for very clear sample water, and is not good for very turbid sample water.

It is an object of the invention to provide a photometric process measurement arrangement providing precise parameter concentration results for clear as well as for turbid sample water.

This object is achieved with a photometric process measurement arrangement with the features of independent apparatus claim 1 and with a photometric measurement method with the features of independent method claim 5.

The photometric process measurement arrangement according to the invention is provided with a photometric immersion probe which is preferably continuously and completely immersed into water of a water basin. The immersion probe comprises a photometer flashlight source for providing photometric light impulses. The photometer flashlight source preferably generates photometric light impulses with a suitable and sufficiently continuous optical spectrum, preferably with an optical spectrum focused on the ultraviolet range for the determination of the concentration of, for example, nitrate and nitrite. Preferably, the flashlight source is a high voltage gas-discharge lamp, more preferably a xenon flashlight lamp.

The photometric detector arrangement comprises at least one separate wavelength-selective detection element, which can be a combination of a wavelength-selective filter and photocell, or comprises another suitable arrangement allowing to wavelength-selectively detect the intensity of at least one discrete wavelength of the light impulses being generated by the flashlight source after being transmitted through the water sample. The photocell can be silicon photocell, and the wavelength-selective filter can be interference bandpass filters.

A photometer control controls the photometer flashlight source by triggering every flashlight source impulse. The photometric control comprises an impulse signal integrator for every detection element for integrating the electric impulses generated by the corresponding detection element. The impulse signal integrator preferably is an electric capacitor. The photometric control comprises an A/D-converter for converting the voltage of the impulse signal integrator. The impulse signal integrator is provided with a corresponding A/D-converter. Every A/D-converter preferably is provided with a high-precision-conversion trigger port. If the high-precision-conversion trigger port is electronically triggered, a high-precision A/D-conversion is initiated. An A/D-conversion with a high-precision can take, for example, up to 100 milliseconds.

The photometer is provided with a flashlight driving module for controlling an impulse ignition switch triggering the photometer flashlight source during an impulse integration cycle. Generally, the impulse frequency can be adaptable. Preferably, the impulse frequency is constant for the lifetime of the photometric process measurement arrangement. Preferably, the constant impulse time period is in the range of 5 to 30 ms.

The photometer control is provided with a measurement cycle control for adapting the total number of integrated cycle impulses of an impulse integration cycle to the impulse intensity of the single electric impulses. In other words, the cycle length and the total number of impulses of an impulse integration cycle after which a compulsory A/D conversion is initiated is adapted to the turbidity of the sample water. If the sample water is relatively clear, the number of photometric light impulses which are generated to define an adapted impulse integration cycle is relatively low. If the water sample is relatively turbid, the number of photometric light impulses defining an adapted impulse integration cycle is relatively high.

The adaption of the length and the total number of integrated cycle impulses of an impulse integration cycle generally can be realized in many different ways. This adaption is not necessarily provided for every single impulse integration cycle. The adaption can be provided flexibly or in fixed intervals, for example for every 20th impulse integration cycle or once every minute. The other following measurement cycles, which are the slave measurement cycles, are not individually adapted but are identically with the adaption measurement cycle, which is the master measurement cycle. This concept allows to spend more time for precisely analyzing and adapting the master measurement cycle than for the following slave measurement cycles, without substantially deteriorating the overall measurement cycle frequency.

The flexible adaption of the length of the measurement cycles allows to utilize the electric capacity of the impulse signal integrator and of the A/D converter to the most possible extend so that the general accuracy of the quantitative photometric determination of a substance in the sample water is substantially increased.

The photometric control is also provided with at least one A/D converter for converting the voltage of the at least one impulse signal integrator in an A/D conversion interval after any impulse integration cycle. A typical high-precision A/D conversion interval takes 50 to 100 ms. As soon as an impulse integration cycle has been finished, the photometer flashlight source is stopped, and all A/D-converters are triggered to read and digitalize the voltage of the corresponding impulse signal integrators in a first compulsory A/D-conversion interval.

According to the invention, an A/D conversion management module for balancing the total number of A/D-conversion intervals within a time frame is provided. The A/D conversion management module provides supplementary A/D conversion intervals after the compulsory A/D conversion interval. The number of supplementary A/D conversion intervals depends on the length of the corresponding impulse integration cycle, so that a long impulse integration cycle is followed by more supplementary A/D-conversion intervals than a short impulse integration cycle. Preferably, the A/D conversion management module provides not a single supplementary A/D conversion interval for relatively short impulse integration cycles for very clear sample water.

The relation between the length of an impulse integration cycle and the sum of all A/D conversion intervals following an impulse integration cycle always is in a defined relation range being substantially constant with an acceptable relation range variation of, for example +/−30% around a medium value of all possible relation values. As a result, the total number of A/D conversion intervals within a defined time frame remains relatively constant independent on the impulse intensity and on the resulting length of the impulse integration cycle. Therefore, the data volume for generating an averaged result can be substantially identical for clear sample water and for turbid sample water.

Preferably, the total number of A/D conversion intervals within the timeframe for all possible lengths of impulse integration cycles is within a range of 50% to 100% of the maximally possible total number of A/D conversion intervals within the timeframe. This means that the data volume for generating an average result is always within a range of 50 to 100% of the maximum data volume of all of the complete range of allowed impulse integration cycle lengths.

The maximum length of an integration impulse integration cycle can be limited to, for example, 64 or 128 integrated cycle impulses.

Preferably, the measurement cycle control comprises a cycle pattern table memory memorizing different cycle pattern with different predefined impulse integration cycles and related predefined number of compulsory and supplementary A/D conversion intervals. Generally, the defined total number of A/D conversion intervals of a sample pattern can simply be one, if only the compulsory A/D conversion interval follows to a relatively short impulse integration cycle.

The measurement cycle control selects a measurement cycle pattern with a predefined impulse integration cycle and a predefined number of related A/D conversion intervals in dependency on the impulse intensity at the beginning of an impulse integration cycle. In other words, the length of the impulse integration cycle and the corresponding total number of A/D conversion intervals can only be chosen from a limited number of a few measurement cycle pattern.

The available measurement cycle pattern can have, for example, only predefined impulse integration cycles with 4 integrated impulses followed by no supplementary A/D conversion interval, 8 integrated impulses followed by one supplementary A/D conversion interval, 16 integrated impulses followed by three supplementary A/D conversion intervals, 21 integrated impulses followed by four supplementary A/D conversion intervals, 32 integrated impulses followed by seven supplementary A/D conversion intervals, or 64 integrated impulses followed by 15 supplementary A/D conversion intervals. Within a timeframe of, for example, 3 seconds, one single impulse integration cycle with 64 integrated electric impulses, two impulse integration cycles each with 32 integrated electric impulses, three impulse integration cycles each with 21 integrated electric impulses, four impulse integration cycles each with 16 integrated electric impulses, eight impulse integration cycles each with 8 integrated electric impulses and sixteen impulse integration cycles each with only 4 integrated electric impulses could be available as parts of the available measurement cycle pattern. As a consequence, the total number of integrated electric impulses is always 63 or 64 and the total number of A/D conversion intervals is always 15 or 16 within the timeframe.

The decision about the length of an adapted impulse integration cycle and the suitable measurement cycle pattern is made at the beginning of an impulse integration cycle, for example after two or three received and integrated electric impulses. The chosen measurement cycle pattern can be maintained for several consecutive measurement cycles or time intervals before a new decision about the suitable measurement cycle pattern is provided.

Using a cycle pattern table memory is relatively simple and does not need substantial computing capacity.

There are generally different technical ways to monitor the development of the voltage of the impulse signal integrator during an impulse integration cycle. Preferably, the monitoring is not realized by providing a high-precision A/D conversion after every single flashlight impulse because a high-precision A/D conversion is relatively time-consuming and takes much more time than an interval between two successive photometric light impulses. Preferably, the high-precision A/D conversion is not provided more than five times within one single measurement cycle. More preferably, the high-precision A/D conversion is not used at all for the monitoring of the development of the voltage of the impulse signal integrator during an impulse integration cycle, but is only used for the final determination of the voltage of the impulse signal integrator after the end of an impulse integration cycle.

Preferably, the photometric control is provided with an integrator reset switch for synchronously resetting all impulse signal integrators before a new measurement cycle starts. The integrator reset switch is triggered after all A/D-converters have provided all A/D conversion intervals referring to a measurement cycle. The integrator reset switch synchronously pulls the voltages of all impulse signal integrators down to zero so that a new impulse integration cycle can be started.

Preferably, the measurement cycle control adapts the total number of integrated cycle impulses of an impulse integration cycle so that a predefined integration target voltage value Ut is reached. The integration target voltage value is at least 20% below the saturation voltage of the impulse signal integrator but is at least 50% of its saturation voltage. The integration target voltage value must be substantially below the saturation voltage of the impulse signal integrator for the case of a very clear water sample causing a relatively high single optical and electrical impulse received by the impulse signal integrator. The offset between the saturation voltage and the integration target voltage value must be higher than the highest possible impulse signal voltage of a single light impulse received by any of the detection elements.

Preferably, the photometer control is provided with a flash counter counting the number of flashes during an impulse integration cycle, and is provided with a maximum flash number memory memorizing a general maximum flash number value of flashes within one single impulse integration cycle. The photometer control triggers the A/D conversion when the number of flashes counted by the flash counter equals or exceeds the memorized maximum flash number. Defining a general maximum number of integrated flashes within one measurement cycle is a fallback measure for the case that the sample water is unexpectedly turbid or if other factors unexpectedly massively weaken the light finally received by the wavelength-selective detection element. In that case, an impulse integration cycle is terminated before the voltage of any of the impulse signal integrators has exceeded the memorized integration target voltage value. A warning signal can be generated in that case to cause a control and maintenance action.

Preferably, every A/D-converter is provided with a low-precision-conversion trigger port, respectively. All low-precision-conversion trigger ports of all A/D converters can synchronously be triggered by a corresponding low-precision request port of the photometric control, preferably, if the voltages of all impulse signal integrators are below the memorized integration target value. A low-precision conversion of an A/D-converter typically takes a few milliseconds, only, so that the low-precision conversion capability of the A/D-converter can be used in the beginning and/or in the course of an impulse integration cycle to provide a forecast of the total number of photometric light impulses within an impulse integration cycle until the voltage of a first of all impulse signal integrators will exceed the memorized integration target voltage value. This forecast allows to perfectly schedule and plan the moment of the relatively time-consuming high precision A/D conversions at the end of an impulse integration cycle.

The technical minimum time interval between two subsequent photometric light impulses generated by the photometer flashlight source is typically in the range of 5 to 30 ms, so that the low-precision conversion interval of a typical A/D converter is shorter than the flashing interval, and therefore does not substantially affect the photometer impulse frequency.

The method claim according to the invention is directed to a photometric measurement method provided by the photometric process measurement arrangement comprising the features of one of the apparatus claims, and comprises the following method steps controlled by the photometer control:

- generating light impulses with the photometer flashlight source, monitoring all impulse signal integrators of the wavelength-selective detection elements,
- adapting the total number of integrated cycle impulses of an impulse integration cycle to the impulse intensity Ui,
- converting the voltage of the impulse signal integrator in a compulsory A/D conversion interval and in optional supplementary A/D conversion intervals after the impulse integration cycle;
- balancing the total number of A/D-conversion intervals within the time frame depending on the length of the corresponding impulse integration cycle, so that a long impulse integration cycle is followed by more supplementary A/D conversion intervals than a short impulse integration cycle.

Preferably, the measurement cycle control selects a cycle pattern from the cycle pattern table memory dependent on the impulse intensity Ui of the current impulse integration cycle.

Figure 2:
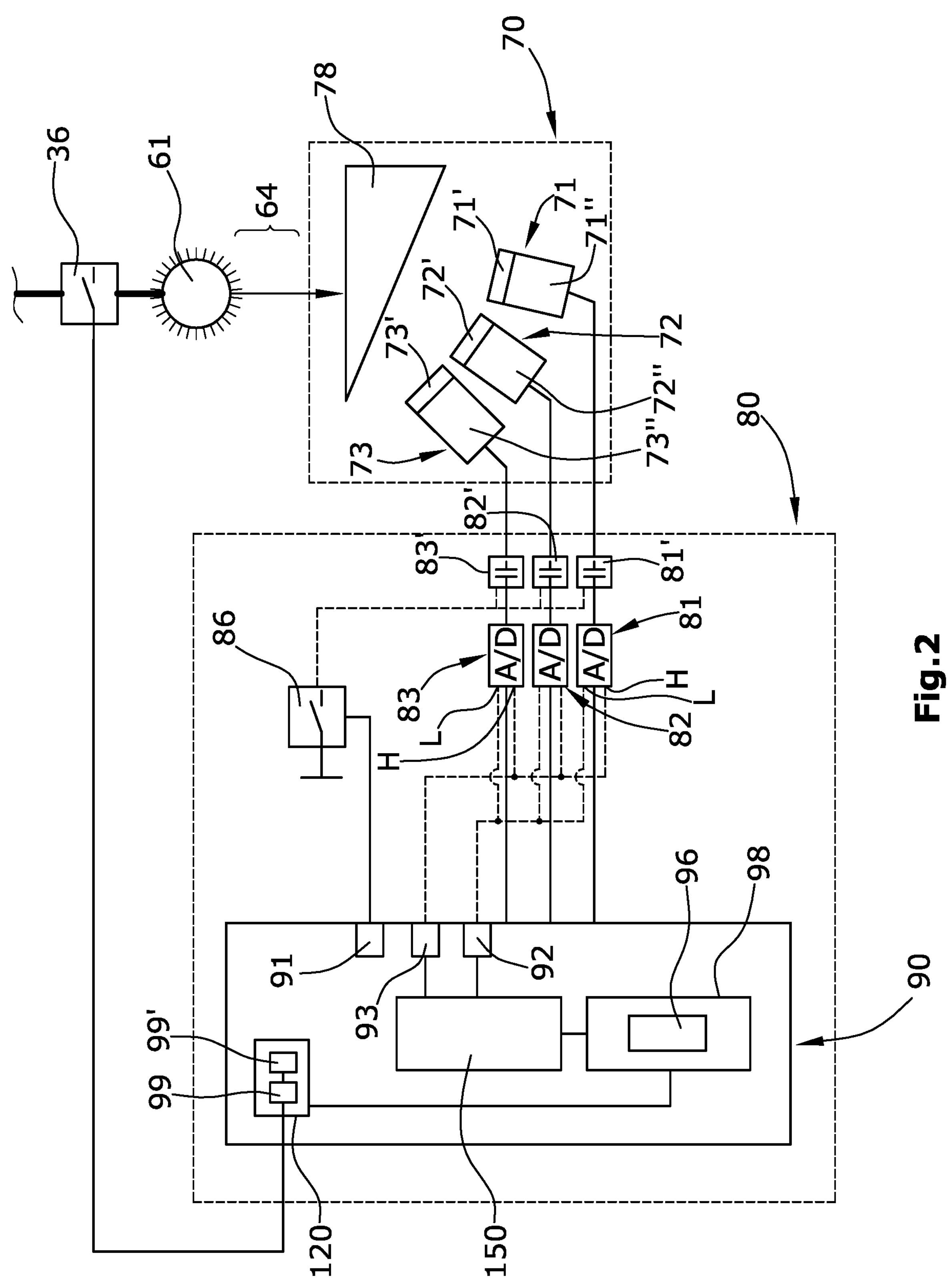

One embodiment of the invention is described with reference to the enclosed drawings, wherein FIG. 1 schematically shows a photometric process measurement arrangement with a photometric immersion probe comprising a photometric detector arrangement and a photometer control, FIG. 2 schematically shows the photometric detector arrangement and the photometer control of FIG. 1 in more detail, and FIGS. 3*a* to 3*d* show diagrams of the voltage versus time of the impulse signal integrator with the highest received light impulse intensity of the photometer control of FIGS. 1 and 2 for different sample water absorptions and turbidities.

FIG. 1 schematically shows a photometric process measurement arrangement 10 substantially consisting of a land-based control unit 12 and a photometric immersion probe 20 being arranged remote from the land-based control unit 12. The immersion probe 20 is arranged below a water surface 18 and is completely immersed into water 17 of a water basin 16. The water basin 16 can be a part of a wastewater treatment plant. Alternatively, the immersion probe 20 can be used in a laboratory application for continuously controlling a water parameter.

The measurement arrangement 10 is generally suitable for quasi-continuously photometrically determine the concentration of at least one water parameter. In the present embodiment, the photometric process measurement arrangement 10 determines the concentration of nitrite and nitrate in the sample water 17 with a measurement frequency of a few seconds.

The photometric immersion probe 20 comprises, within a fluidtight probe housing 22, an electronic flyback-converter 30 for energizing an impulse energy capacitor 33, comprises an impulse ignition switch 36 and a photometer flashlight source 61 being a xenon flash lamp for providing photometric light impulses with a sufficiently quasi-continuous spectrum in the ultraviolet range. The flyback-converter 30 is supplied by the land-based control unit 12 with electric energy via an electric supply line 52, and comprises a converter switch 31, a transformer 32 and a blocking diode 35. The charging duration for charging a completely empty impulse energy capacitor 33 is about 5 to 10 ms until the impulse energy capacitor's voltage reaches a defined ignition voltage value.

The photometric immersion probe 20 comprises a photometric detector arrangement 70 with an optical beam splitter 78 and three separate wavelength-selective detection elements 71, 72, 73. Every wavelength-selective detection element 71, 72, 73 comprises an interference bandpass filter 71',72',73' and a corresponding photocell 71",72",73". The detection elements 71, 72, 73 detect the light impulses generated by the flashlight source 61 at wavelengths of 218 nm, 225 nm and 245 nm. The 218 nm and the 225 nm detection elements 71, 72 are used for the direct detection of the extinction/absorption caused by the nitrite and the nitrate concentration in the probe water. The 245 nm detection element 73 is a reference detector for supervising the general constitution and performance of the flashlight source 61 and of the optical path between the flashlight source 61 and the detection elements 71,72,73. The photometer flashlight source 61 and the photometric detector arrangement 70 define a photometer device for detecting the light absorption of sample water in a photometric measuring section 64 defined between a measuring section light inlet window 65 and a measuring section light outlet window 66.

The photometric immersion probe 20 comprises a photometer control 80 with three impulse signal integrators 81',82',83', three corresponding A/D-converters 81,82,83, an integrator reset switch 86 and a measurement cycle control 90. The impulse signal integrators 81',82',83' technically are capacitor elements and accumulate the electric voltage impulses generated by the photometric detection unit 70 until the integrator reset switch 86 is closed and all impulse signal integrators 81', 82' 83' are discharged. The impulse signal integrators 81, 82' 83' have a saturation voltage Us of, for example, 2600 mV.

The three A/D-converters 81,82,83 each have a high-precision-converting trigger port H and a low-precision-converting trigger port L. When the low-precision-converting trigger ports L of the three A/D-converters 81, 82, 83 are synchronously triggered, low-precision A/D conversions of the actual voltages of the three corresponding impulse signal integrators 81, 82', 83' are provided which takes only a about 2 ms.

When the high-precision-converting trigger ports of the three A/D converters 81, 82, 83 are synchronously triggered, very precise and high-precision A/D-conversions of the actual voltages of the three corresponding impulse signal integrators 81', 82', 83' are provided by the corresponding A/D converters 81, 82, 83 which takes about 65 ms.

The measurement cycle control 90 comprises a reset port 91 for activating the integrator reset switch 86, comprises a low-precision request port 92 for synchronously requesting a low-precision A/D conversion via the low-precision-converting trigger ports L of the A/D converters 81, 82, 83, and comprises a high-precision-request port 93 for synchronously requesting a high-precision A/D conversion via the high-precision-converting trigger ports H of the three A/D converters 81, 82, 83.

The measurement cycle control 90 comprises a flashlight driving module 120 controlling the impulse ignition switch 36 triggering the photometer flashlight source 61 with a constant impulse frequency during an impulse integration cycle 204; 221; 264. The measurement cycle control 90 also comprises a flash counter 99 counting and controlling the number of cycle flashes FL generated by the flashlight source 61 within one impulse integration cycle 204; 221; 264 and comprises a maximum flashing number memory 99' memorizing a maximum flash number FLmax of, in this embodiment, 64 flashes.

The measurement cycle control 90 can comprise an integration target memory memorizing an integration target voltage value Ut and can comprise an evaluation module for continuously evaluating the digital A/D-converter results in relation to the integration target voltage value Ut. The integration target voltage value Ut can be, for example, 2000 mV.

The measurement cycle control 90 also comprises an A/D conversion management module 150, a cycle pattern table memory 96 and a cycle pattern selection unit 98 being connected to the A/D conversion management module 150. The A/D conversion management module 150 basically balances the total number of A/D conversion intervals 100-111 within a timeframe F, so that the total number of A/D conversion intervals 100-111 within a timeframe F always remains substantially constant with in a tolerance of less than 30%.

The A/D conversion management module 150 balances the total number of A/D conversion intervals 100-111 within the timeframe F by causing supplementary A/D conversion intervals 101-111 after the compulsory A/D conversion intervals 100 depending on the length of the corresponding preceding impulse integration cycle 204; 221; 264, which will be explained with reference to the FIGS. 3*a* to 3*d*.

The immersion probe 20 comprises an electronic probe control 50 for controlling the communication between the photometer control 80 of the immersion probe 20 and a control electronics 14 of the land-based control unit 12 via a signal line 51.

When the photometer control 80 starts a new frame cycle having the length of a time frame F, the impulse ignition switch 36 is electronically caused by the flashlight driving module 120 to provide photometric light impulses generated by the photometer flashlight source 61 with a constant flashing interval of, for example, about 20 ms. After the second photometric light impulse of the new measurement cycle MC, the photometer control 80 requests a low-precision-conversion via the low-precision request port 91 and the connected low-precision-conversion trigger ports L of all A/D-converters 81, 82, 83, and determines a very rough value of the impulse intensity Ui of a single electric impulse of the new impulse integration cycle 204; 221; 264.

The determined rough impulse intensity Ui is evaluated by the cycle pattern selection unit 98 to select a suitable cycle pattern memorized in the cycle pattern table memory 96. A cycle pattern is a defined combination of an impulse integration cycle 204; 221; 264, a compulsory A/D conversion interval 100 and no, one or more supplementary A/D conversion interval(s) 101-111 following to the compulsory A/D conversion interval 100. In the present embodiment, the cycle pattern table memory 96 memorizes six different cycle pattern with impulse integration cycles with 4, 8, 16, 21, 32 or 64 integrated impulses, each impulse integration cycle followed by a compulsory A/D conversion interval 100, and the 8-impulse integration cycle additionally provided with one supplementary A/D conversion interval, the 16-impulse integration cycle additionally provided with three supplementary A/D conversion intervals, the 21-impulse integration cycle 221 additionally provided with three supplementary A/D conversion intervals 101-103, the 32-impulse integration cycle additionally provided with seven supplementary A/D conversion intervals and the 64-impulse integration cycle 264 additionally provided with ten supplementary A/D conversion intervals 101-111.

The combination of the impulse integration cycle 204; 221; 264 and the corresponding compulsory A/D conversion interval 100 defines a measurement cycle MC.

The selection of the suitable cycle pattern is always provided for the highest impulse intensity Ui of all detection elements 71, 72, 73, which guarantees that after the last impulse of the impulse integration cycle 204; 221; 264 the integrated intensity U of at least one of the detection elements 71, 72, 73 is above an integration target voltage value Ut.

Alternatively to the selection of a suitable cycle pattern from the cycle pattern table memory 96, the length of an impulse integration cycle can be determined more accurately: An evaluation module continuously compares the digital low-precision voltage values U provided by the A/D-converters 81, 82, 83 with the memorized predefined integration target voltage value Ut memorized in the integration target memory. As long as the highest digital voltage value U of all A/D converters 81, 82, 83 is below the memorized integration target voltage value Ut, the impulse integration cycle is continued by continuing the flashing action. As soon as the voltage U of the first of all impulse signal integrators 81', 82', 83' has exceeded the memorized integration target voltage value Ut, the flashing action is stopped and a compulsory A/D conversion interval 100 is initiated.

After the compulsory A/D conversion interval 100, the A/D-conversion management module 150 determines and causes a suitable number of supplementary A/D conversion intervals 101-111.

For providing any of the A/D conversion intervals 100-111, the photometer control 80 requests a synchronous high-precision-A/D-conversion via the high-precision request port 93 and the corresponding high-precision-converting trigger ports H of all A/D converters 81, 82, 83 to determine the final digital voltage values of all impulse signal integrators 81', 82', 83'.

The geometric mean of all digital voltage values of all A/D conversion intervals 100-111 within the time frame F are converted into corresponding concentration values of nitrite and nitrate in the sample water 17 and into a corresponding device condition value.

After the last high-precision conversion 100-111 after an impulse integration cycle 204; 221; 264, the reset port 91 of the measuring cycle control 90 causes the integrator reset switch 86 to reset the impulse signal integrators 81', 82' 83' to be reset to a voltage value of zero, so that the photometer is a ready for the following measurement cycle MC.

FIGS. 3*a* to 3*d* show frame cycles for different sample water absorptions for that detector element receiving the highest light intensity of all three detector elements 71, 72, 73. The impulse time interval ti is always constant and is about 20 ms. The high-precision conversion time interval tc of a single high-precision conversion interval 100 is always constant and is about 65 ms.

Figures 3A, 3B:
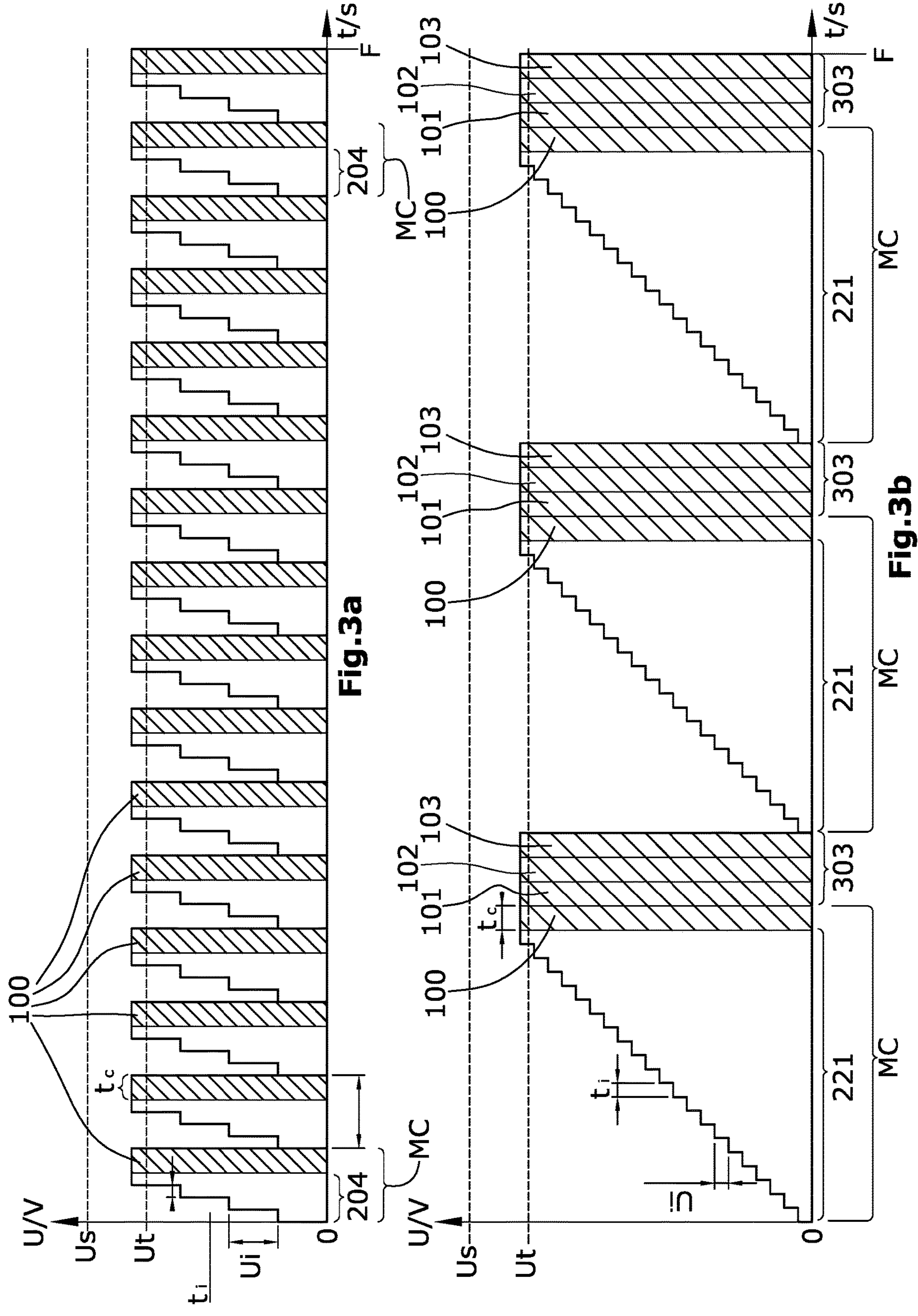

FIG. 3*a* shows, for the one detector element of all detector elements 71, 72, 73 receiving the highest light intensity, 16 identical measurement cycles MC for very clear drinking water causing a very low general light absorption. Every photometric light impulse therefore causes a relatively high impulse voltage Ui at the corresponding impulse signal integrator 81', 82', 83'. After the third flashlight source impulse, the measuring cycle control 90 receives the low-precision digital voltage value U of the corresponding A/D converter 81, 82, 83, and the cycle pattern selection unit 98 selects the suitable cycle pattern shown in FIG. 3*a* from the cycle pattern table memory 96.

The measuring cycle control 90 stops the flashing action after the 4$^{th}$ impulse and causes all A/D converters 81, 82, 83 to provide a high-precision compulsory A/D conversion 100 with the maximum converter resolution of 16 bit. After the compulsory A/D conversion 100 has been finalized, the integrator reset switch 86 is shortly closed for synchronously resetting and completely discharging all impulse signal integrators 81', 82', 83' so that a new measurement cycle MC can be started successively.

Figures 3C, 3D:
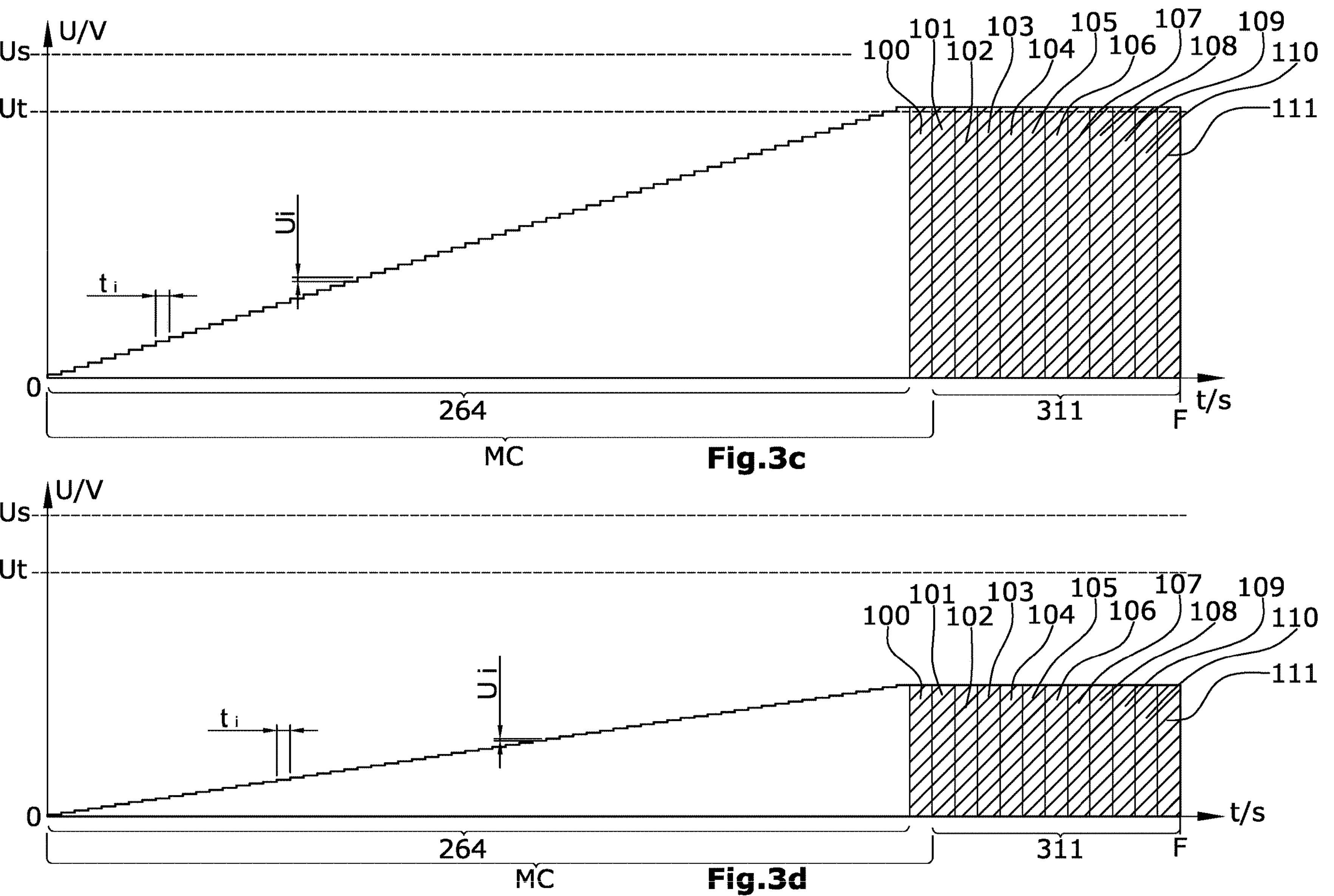

FIGS. 3*b* and 3*c* show measurement cycles MC for more turbid sample water causing less intensive single impulse voltages Ui and causing correspondingly longer measurement cycles MC. As can be seen in FIGS. 3*b*, 3*c* and 3*d*, the selected cycle pattern include three or ten supplementary A/D conversion intervals 101-111 right after the compulsory A/D conversion interval 100.

FIG. 3D shows a measurement cycle MC and a corresponding cycle pattern for a very turbid water sample with a very low single impulse voltage Ui. Even if the integrated intensity U has not reached the integration target voltage UT, the impulse integration cycle 264 is terminated after 64 impulses.

Generally, the measurement cycle control 90 including the flashlight thermal management module 130 determines and defines a complete frame cycle after the first impulses of the frame cycle. A new adaption of impulse integration cycles is not provided before the following frame cycle.

The invention claimed is:

1. A photometric process measurement arrangement, comprising:

a photometric immersion probe, the photometric immersion probe comprising a photometer flashlight source for providing photometric light impulses;

a photometric detector arrangement comprising a wavelength-selective detection element; and a photometer control controlling the photometer flashlight source and the detector arrangement, the photometer control comprising:

impulse signal integrators for integrating the electric impulses having the impulse intensity generated by the detection element of one impulse integration cycle;

a measurement cycle control for adapting the total number of photometric light impulses integrated during one impulse integration cycle to the impulse intensity of the single electric impulses generated by the detection element;

A/D-converters for converting the voltage of the impulse signal integrator in a compulsory A/D conversion interval after the impulse integration cycle;

a flashlight driving module for controlling an impulse ignition switch triggering the photometer flashlight source during the impulse integration cycle; and an A/D-conversion management module for balancing the total number of A/D conversion intervals within a time frame, wherein the A/D conversion management module provides optional supplementary A/D conversion intervals after the compulsory A/D conversion interval depending on the length of the corresponding impulse integration cycle, so that a long impulse integration cycle is followed by more supplementary A/D conversion intervals than a short impulse integration cycle.

2. The photometric process measurement arrangement of claim 1, wherein the total number of A/D conversion intervals within the timeframe for all possible lengths of impulse integration cycles is within a range of 50% to 100% of the maximum possible total number of A/D conversion intervals within the timeframe.

3. The photometric process measurement arrangement of claim 1, wherein the measurement cycle control comprises a cycle pattern table memory memorizing different cycle pattern with predefined impulse integration cycles and a related predefined number of compulsory and supplementary A/D conversion intervals.

4. The photometric process measurement arrangement of claim 1, wherein the measurement cycle control adapts the total number of photometric light impulses of an impulse integration cycle so that a predefined integration target voltage value is reached, whereas the integration target voltage value is at least 20% below the saturation voltage of the impulse signal integrators.

5. A photometric measurement method provided by the photometric process measurement arrangement of claim 1, with the following method steps controlled by the photometer control:

generating light impulses with the photometer flashlight source;

monitoring the impulse signal integrator of the wavelength-selective detection element;

adapting the total number of photometric light impulses of an impulse integration cycle to the impulse intensity;

converting the voltage of the impulse signal integrator in a compulsory A/D conversion interval and in an optional supplementary A/D conversion interval after the impulse integration cycle; and balancing the total number of A/D-conversion intervals within a time frame depending on the length of the corresponding impulse integration cycle, so that a long impulse integration cycle is followed by more supplementary A/D conversion intervals than a short impulse integration cycle.

6. The photometric measurement method of claim 5, wherein the measurement cycle control selects a cycle pattern from the cycle pattern table memory dependent on the impulse intensity of the current impulse integration cycle.

* * * * *